United States Patent
Brunk

(10) Patent No.: US 6,993,154 B2
(45) Date of Patent: Jan. 31, 2006

(54) MEASURING DIGITAL WATERMARK STRENGTH USING ERROR CORRECTION CODING METRICS

(75) Inventor: Hugh L. Brunk, Portland, OR (US)

(73) Assignee: Digimarc Corporation, Beaverton, OH (US)

( * ) Notice: Subject to any disclaimer, the term of this patent is extended or adjusted under 35 U.S.C. 154(b) by 0 days.

(21) Appl. No.: 10/856,678

(22) Filed: May 28, 2004

(65) Prior Publication Data

US 2004/0218782 A1 Nov. 4, 2004

Related U.S. Application Data

(63) Continuation of application No. 09/840,016, filed on Apr. 20, 2001, now Pat. No. 6,760,464, which is a continuation of application No. 09/689,226, filed on Oct. 11, 2000, now Pat. No. 6,694,041.

(51) Int. Cl.
*G06K 9/00* (2006.01)

(52) U.S. Cl. .................... 382/100; 713/176

(58) Field of Classification Search ............ 382/100, 382/232, 240; 380/51, 54, 201, 210, 252, 380/287; 370/522–529; 713/176, 179; 348/461, 348/463; 725/9, 20, 22; 283/72, 74–81, 283/93, 113, 901, 902; 358/3.28; 375/130; 386/94

See application file for complete search history.

(56) References Cited

U.S. PATENT DOCUMENTS 5,091,966 A 2/1992 Bloomberg et al.

(Continued)

FOREIGN PATENT DOCUMENTS

EP 0493091 7/1992

(Continued)

OTHER PUBLICATIONS

Declaration by Claude Zeller, dated May 13, 2005, 2 pages.
Bender et al., Applications for Data Hiding, IBM Systems Journal, vol. 39, Nos. 384, 2000, pp. 547-568.

(Continued)

*Primary Examiner*—Kanjibhai Patel
*Assistant Examiner*—Abolfazl Tabatabai
(74) *Attorney, Agent, or Firm*—Digimarc Corporation

(57) ABSTRACT

A method of embedding a digital watermark into a halftone image. The method redundantly encodes a multi-bit message, and transforms the encoded message to a multilevel per pixel watermark image. It then derives halftone thresholds from the multilevel per pixel watermark image. These thresholds are then used to convert target images into watermarked halftone images.

The multilevel pixels in the target image are used to select corresponding halftone thresholds from the halftone thresholds derived from the watermark image. The selected thresholds are applied to corresponding multilevel pixels in the watermark image to create the watermarked halftone image of the target image.

A method of measuring digital watermark strength. In this method, a watermarked signal is processed to extract estimates of error correction encoded bits embedded into the watermarked signal. Then, the error correction encoded bits are decoded to compute a message payload. The message payload is re-encoded to compute error correction encoded bits. A measure of watermark strength is computed from the error correction encoded bits and the estimates of error correction encoded bits. In particular, in one implementation the soft bit estimates decoded from the watermarked signal are multiplied by corresponding re-computed error correction encoded bits and summed to get a measure of the watermark signal strength. This measurement may be compared with a threshold to detect tampering with the watermarked signal, such as compression, scanning and re-printing, photo-copying, etc.

For printing applications, the embedded digital watermark may be used to carry printer information that is later decoded by a watermark detector and used to examine a digital scan of a printed object and determine whether the printed object is authentic.

11 Claims, 3 Drawing Sheets

U.S. PATENT DOCUMENTS

| | | | |
|---|---|---|---|
| 5,559,933 A | 9/1996 | Boxwell | |
| 5,768,426 A | 6/1998 | Rhoads | |
| 5,825,892 A | 10/1998 | Braudaway et al. | |
| 5,951,055 A | 9/1999 | Mowry, Jr. | |
| 5,974,548 A | 10/1999 | Adams | |
| 6,069,914 A * | 5/2000 | Cox | 375/150 |
| 6,101,602 A | 8/2000 | Fridrich | |
| 6,104,812 A | 8/2000 | Koltai et al. | |
| 6,205,249 B1 * | 3/2001 | Moskowitz | 382/232 |
| 6,233,684 B1 | 5/2001 | Stefik et al. | |
| 6,239,818 B1 | 5/2001 | Yoda | |
| 6,246,777 B1 | 6/2001 | Agarwal et al. | |
| 6,275,599 B1 | 8/2001 | Adler et al. | |
| 6,285,775 B1 | 9/2001 | Wu et al. | |
| 6,332,031 B1 | 12/2001 | Rhoads et al. | |
| 6,363,162 B1 | 3/2002 | Moed et al. | |
| 6,389,055 B1 * | 5/2002 | August et al. | 375/130 |
| 6,449,377 B1 | 9/2002 | Rhoads | |
| 6,512,837 B1 | 1/2003 | Ahmed | |
| 6,533,385 B1 | 3/2003 | Mackay et al. | |
| 6,557,103 B1 * | 4/2003 | Boncelet et al. | 713/176 |
| 6,574,350 B1 | 6/2003 | Rhoads et al. | |
| 6,591,009 B1 | 7/2003 | Usami et al. | |
| 6,625,295 B1 * | 9/2003 | Wolfgang et al. | 382/100 |
| 6,636,615 B1 | 10/2003 | Rhoads et al. | |
| 6,683,966 B1 | 1/2004 | Tian et al. | |
| 6,694,040 B2 * | 2/2004 | Hayashi et al. | 382/100 |
| 6,694,041 B1 | 2/2004 | Brunk | |
| 6,704,431 B1 * | 3/2004 | Ogawa et al. | 382/100 |
| 6,714,683 B1 | 3/2004 | Tian et al. | |
| 6,721,440 B2 | 4/2004 | Reed et al. | |
| 6,728,390 B2 | 4/2004 | Rhoads et al. | |
| 6,744,906 B2 | 6/2004 | Rhoads et al. | |
| 6,760,464 B2 | 7/2004 | Brunk | |
| 6,763,123 B2 | 7/2004 | Reed et al. | |
| 6,771,797 B2 | 8/2004 | Ahmed | |
| 6,785,401 B2 * | 8/2004 | Walker et al. | 382/100 |
| 2001/0008557 A1 | 7/2001 | Stefik et al. | |
| 2001/0024510 A1 | 9/2001 | Iwamura | |
| 2002/0031240 A1 | 3/2002 | Levy et al. | |
| 2002/0037093 A1 | 3/2002 | Murphy | |
| 2002/0076082 A1 | 6/2002 | Arimura et al. | |
| 2002/0095577 A1 | 7/2002 | Nakamura et al. | |
| 2002/0099943 A1 | 7/2002 | Rodriguez et al. | |
| 2002/0105679 A1 | 8/2002 | Haynes | |
| 2002/0176114 A1 | 11/2002 | Zeller et al. | |
| 2003/0112997 A1 | 6/2003 | Ahmed | |

FOREIGN PATENT DOCUMENTS

| | | |
|---|---|---|
| EP | 0629972 | 12/1994 |
| EP | 1096429 | 5/2001 |
| EP | 1173001 | 1/2002 |
| EP | 1209897 | 5/2002 |
| JP | 406286275 A | 10/1994 |
| JP | 410051632 A | 2/1998 |
| JP | 02000078391 A | 3/2000 |
| WO | WO0173997 | 10/2001 |
| WO | WO0237309 | 5/2002 |
| WO | WO02056264 | 7/2002 |
| WO | WO02059712 | 8/2002 |

OTHER PUBLICATIONS

Braudaway et al., "Application of Invisible Image Watermarks to Produce Remotely Printed, Duplication Resistant, and Demonstrably Authentic Documents," Proc. SPIE—Int. Soc. Opt. Eng,. vol. 4314, pp. 351-359.

Communication of Postal Information Using Two-Dimensional Symbols, Draft Under Implementation, Mar. 19, 1998, 21 pages.

NCITS-WI 990124 IS 13660 Proof, 1997, 27 pages.

Schneider et al. "A Robust Content Based Digital Signature for Image Authentication," from 1996 IEEE Int. Conf. on Image Processing.

Tian, "Wavelet-Based Reversible Watermarking for Authentication," Proc. SPIE—Int. Soc. Opt. Eng., vol. 4675, 2002, pp. 679-690.

Tian, "Wavelet-Based Image Compression and Content Authentication," Oct. 22, 2001, Proc. SPIE—Int. Soc. Opt. Eng, vol. 4551, pp. 11-20.

van Schyndel et al., "Towards A Robust Digital Watermark," Second Asia Conf. on Computer Vision, Dec. 5, 1995, pp. 504-508.

Wu et al., "Data Hiding in Digital Binary Image," 2000 IEEE, pp. 393-396.

Yeung et al., "An Invisible Watermarking Technique for Image Verification," Proc. Int. Conf. on Image Processing, vol. 1, pp. 680-683, Oct. 1997.

Yeung et al., "Digital Watermarks: Shedding Light on the Invisible," 1998 IEEE, pp. 32-41.

* cited by examiner

Fig. 1
Prior Art

| | X | 7/16 |
|---|---|---|
| 3/16 | 5/16 | 1/16 |

Fig. 2
Prior Art

| 1/16 | 5/16 | 3/16 |
|---|---|---|
| 7/16 | X | |

Fig. 3

| 1/16 | 5/16 | 3/16 |
|---|---|---|
| 7/16 | X | 7/16 |
| 3/16 | 5/16 | 1/16 |

MEASURING DIGITAL WATERMARK STRENGTH USING ERROR CORRECTION CODING METRICS

RELATED APPLICATION DATA

This application is a continuation of U.S. patent application Ser. No. 09/840,016, filed Apr. 20, 2001 (Now U.S. Pat. No. 6,760,464), which is a continuation in part of U.S. patent application Ser. No. 09/689,226, filed Oct. 11, 2000, (now U.S. Pat. No. 6,694,041) which is hereby incorporated by reference.

TECHNICAL FIELD

The invention relates to multimedia signal processing, and in particular relates to image watermarking methods and related applications.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 (now U.S. Pat. No. 6,614,914) and U.S. Pat. No. 5,862,260, which are hereby incorporated by reference.

The invention provides halftone image watermark methods and systems.

One aspect of the invention is a method of embedding a digital watermark into a halftone image. The method redundantly encodes a multi-bit message, and transforms the encoded message to a multilevel per pixel watermark image. It then derives halftone thresholds from the multilevel per pixel watermark image. These thresholds are then used to convert target images into watermarked halftone images.

The multilevel pixels in the target image are used to select corresponding halftone thresholds from the halftone thresholds derived from the watermark image. The selected thresholds are applied to corresponding multilevel pixels in the watermark image to create the watermarked halftone image of the target image.

Another aspect of the invention is a method of measuring digital watermark strength. In this method, a watermarked signal is processed to extract estimates of error correction encoded bits embedded into the watermarked signal. Then, the error correction encoded bits are decoded to compute a message payload. The message payload is re-encoded to compute error correction encoded bits. A measure of watermark strength is computed from the error correction encoded bits and the estimates of error correction encoded bits. In particular, in one implementation the soft bit estimates decoded from the watermarked signal are multiplied by corresponding re-computed error correction encoded bits and summed to get a measure of the watermark signal strength. This measurement may be compared with a threshold to detect tampering with the watermarked signal, such as compression, scanning and re-printing, photo-copying, etc.

For printing applications, the embedded digital watermark may be used to carry printer information that is later decoded by a watermark detector and used to examine a digital scan of a printed object and determine whether the printed object is authentic.

Further features will become apparent with reference to the following detailed description and accompanying drawings.

BRIEF DESCRIPTION OF THE DRAWINGS

FIG. 1 is a diagram illustrating an example of an error diffusion mask used in creating halftone images from multilevel per pixel images.

FIG. 2 is a diagram illustrating another example of an error diffusion mask used in creating halftone images from multilevel per pixel images.

FIG. 3 is a diagram illustrating another example of an error diffusion mask used in creating halftone images from multilevel per pixel images.

DETAILED DESCRIPTION

Figure 4:
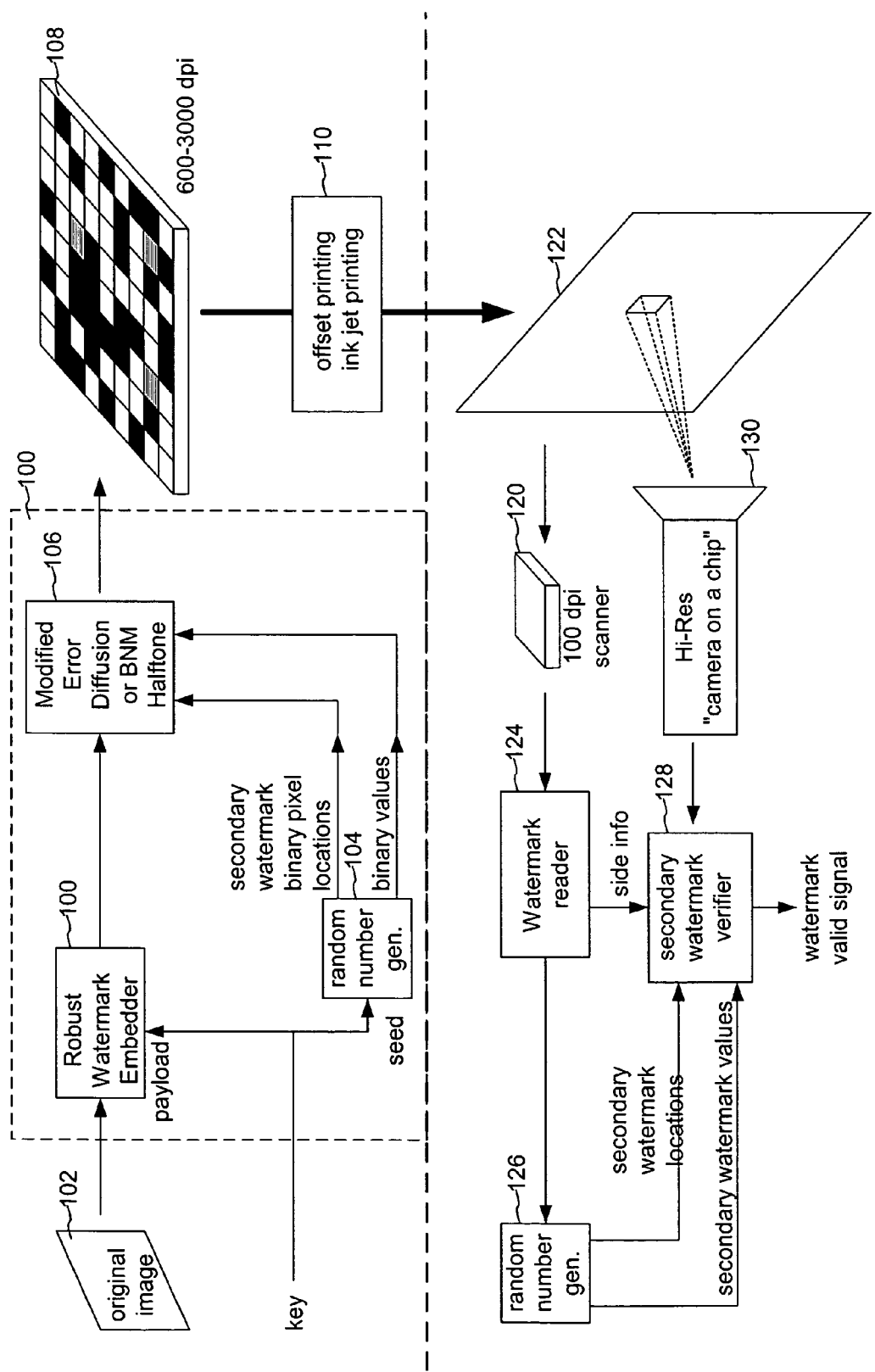
FIG. 4 is a diagram of an application of a halftone watermark application.

The following description details methods for watermarking halftone images and related applications. While the watermarking methods apply to other forms of halftoning, the description provides specific examples applicable to error diffusion techniques used to create halftone images.

One form of error diffusion used in processing halftone images is called Floyd-Steinberg error diffusion. In a typical implementation for 8 bit per pixel images, this error diffusion method takes a 0–255 level input image at a first resolution (e.g., 200 pixels per inch) and produces a binary image with a higher resolution (e.g., 600 dots per inch). This description details an implementation for an image plane where each pixel has a corresponding multilevel value, such as a luminance value, or some other color channel like cyan, magenta, yellow, etc. The description applies to color images with more than one multilevel value per pixel. In such cases, a halftone process operates on each of the color channels per pixel and creates a halftone image for each channel.

As a first step, the input image is upsampled to the higher resolution. One approach for producing the binary 600 dots per inche (dpi) image from the upsampled 0–255 level 600 pixel per inch (ppi) image is to threshold the pixel values so that a pixel value less than 128 produces a zero in the corresponding location of the binary image; otherwise the corresponding location would be set to a one. Error diffusion takes this general approach in a raster-scan order, but achieves improved performance by "diffusing" the error at each location to nearby locations yet to be processed. This error diffusion is guided by a weighting mask, shown in FIG. 1.

The "X" represents the pixel location currently being processed, and the adjoining cells show how the error from that location is diffused. For this algorithm, the sum of the diffused errors is equal to the total error at location X. For any specific binary location, the accuracy of this method is no better than the simple thresholding approach. However, if a pixel from the original 200 ppi image is compared with the corresponding 3×3 binary region, the number of cells with a one is closely correlated with the multilevel pixel value.

A more prescise description of the basic error diffusion algorithm uses three equations. See "Digital Color Halftoning", p. 359, by Kang (co-published by The International Society for Optical Engineering and IEEE Press 1999), which is incorporated by reference:

(m,n): binary (upsampled) pixel location $p_i(m,n)$: upsampled input intensity, 0–255

$p'(m,n)$: modified input intensity $p_o(m,n)$: output binary value $e(m,n)$: error at location (m,n)

$w_{kl}$: error diffusion weighting coefficients $$p'(m,n) = p_i(m,n) + \sum_{kl} w_{kl} e(m-k, n-l)$$

$$p_o(m,n) = \begin{cases} 1 : p'(m,n) \geq 128 \\ 0 : p'(m,n) < 128 \end{cases}$$

$$e(m,n) = p'(m,n) - 255 p_o(m,n)$$

The weighting mask shown in FIG. 1 can be modified to show which errors are diffused into a given location. FIG. 2 shows an example of such modifications.

In the following sections, we describe a modified error diffusion method that embeds a watermark comprising a set of binary values at specified dot locations in a binary image. This method starts with an upsampled binary host image, a list of dot locations in a binary image and corresponding binary values for a watermark. This method assigns to these locations the corresponding values of the watermark and tries to improve the image with an error diffusion algorithm at the other (non-watermark) locations. It is assumed that the fraction of total pixels occupied by the watermark is small.

In the error diffusion algorithm introduced above, the error for a given location is always calculated after the algorithm has processed all preceding locations. Typically, the algorithm scans a rectangular image comprising scanline rows of pixels starting from the top row and scanning from left to right across each row. The modified error diffusion method calculates error values for all locations at the start and modifies them as the method proceeds. At the start, the error of all locations not covered by the watermark are set to zero. For a location covered by the watermark, the error is calculated as $$e(m,n) = p_i(m,n) - 255 W(m,n)$$

where W(m,n) is the value of the watermark at location (m,n). A new set of error diffusion weights is used; the pattern of error diffusion into location X is shown in FIG. 3.

In this method, the diffusion of errors takes place in two directions. Errors from the watermarked locations are diffused in one direction (backwards in this case), and errors from processed locations are diffused in another direction (forwards). As each location is processed, the error for that location is updated for later diffusion. The calculation of the output binary value is unchanged from the error diffusion algorithm, with the exception at watermark locations, where $p_o(m,n)$ is set to W(m,n).

The appearance of the watermark can be improved by arranging locations of watermark dots in a pseudorandom pattern subject to some additional human visual system frequency response criteria. One approach for arranging the locations of the watermark dots is to use a minimum visual cost technique. In this approach the watermark is chosen by minimizing a visual cost function such as $$C = \int\int |H(f_x,f_y) V(f_x,f_y)|^2 df_x df_y$$

where $H(f_x,f_y)$ is the frequency spectrum of the watermark and $V(f_x,f_y)$ is a frequency response model of the human visual system. One possible such model is due to Sullivan et al. and given in Kang, section 5.6. The effect of this cost function is to weight the frequency content of the watermark by the human visual ability to detect it. In this manner, watermark patterns that move the frequency content to a region of the frequency spectrum where the human visual system is less sensitive will have a lower cost. This method of selecting locations and values of watermark dots provides a perceptually more even distribution of the dots in solid regions (e.g., white regions in a grayscale image). Searching for a watermark with a low cost can be done by a variety of methods; one such method is simulated annealing.

The encoder may repeat the watermark in blocks of the host image, such as contiguous blocks of pixels throughout the image. Each block may use the same or a different key. If the encoder uses different keys per block, each key may be related to another key by a secret function, such as a cryptographic function.

To read the watermark, a watermark decoder uses a key specifying where the watermark dots are located. It then determines the binary values of those dots. In cases where the watermark is embedded in a printed image, a scanner or camera with sufficiently high resolution to read the halftone dots creates a digital image from which the decoder extracts the watermark.

There are many applications of this type of watermark. It may be used to carry a message, including usage control instructions or other metadata like an identifier of the image owner or an index to a database record storing related information. It may also convey a fixed pattern used to determine whether a watermarked image (e.g., a printed halftone watermarked image) is authentic or has been altered. In such an application, the decoder compares the extracted watermark pattern with the known pattern, and based on this comparison determines whether the watermarked image has been altered (e.g., copied, scanned and re-printed, compressed, etc.). It can also specify where the image has been altered by showing locations in the scanned image where the halftone watermark is not present.

Since the watermark is applied to halftone images it may be applied as part of the printing process where a multilevel per pixel digital image is converted to a halftone image. For example, it may be incorporated into the halftoning process implemented in a printer device or printer driver executing in a computer that sends the image to the printer for printing. More generally, the watermarking method may be applied in applications where halftone images are printed, including commercial printing presses as well as personal printing devices, such as ink jet printers.

In some types of image watermarking, the host image interferes with the watermark. The host image provides a communication channel for the watermark. In decoding the watermark from a host image, the host image can be considered noise that interferes with the ability of the watermark decoder to accurately extract the watermark signal. To increase the chances of accurate recovery of the watermark, it is spread throughout a large portion (perhaps the entire image) of the host image.

The type of watermark described in the previous paragraph can be embedded directly into a halftone image. The following discussion details an error diffusion method for directly embedding this type of watermark into a halftone image.

In this method, the watermark to be embedded, W(m,n), takes values from 0–255. The error diffusion process is changed so that the threshold used to calculate the binary output values is modulated by the watermark signal:

$$p_o(m, n) = \begin{cases} 1 : p'(m, n) \geq T(m, n) \\ 0 : p'(m, n) < T(m, n) \end{cases}$$

$$T(m,n)=128-I(W(m,n)-128)$$

The intensity level I controls how heavily the watermark is embedded in the image.

As an alternative to modulating error diffusion thresholds, the watermark may be embedded without modifying the halftoning process. For example, a multilevel per pixel watermark signal is created at the resolution of a target halftone image. The watermark encoder produces the multilevel per pixel watermark signal at the desired resolution of the halftone image, or at some other resolution and up or down samples it to match the resolution of a target halftone image. This watermarked signal is then added to the host image at the same spatial resolution to create a composite, watermarked image. The error diffusion process or some other type of halftone process may then be applied directly to this composite image to generate a watermarked halftone image. This technique applies to a variety of halftone processes including ordered dithering (e.g., blue noise masks, clustered dot halftones, etc.) as well as error diffusion halftone processes.

There are a variety of ways to generate the watermark signal. One approach is to take an auxiliary message comprising binary or M-ary symbols, apply error correction coding to it, and then spread spectrum modulate the error correction encoded message. One way to spread spectrum modulate the message is to spread each binary symbol in the message over a pseudorandom number, using an exclusive OR operation or multiplication operation. The resulting binary message elements in the spread spectrum modulated message signal are then mapped to spatial image locations. The watermark signal may be expressed in a binary antipodal form, where binary symbols are either positive or negative. To increase robustness, the spread spectrum modulated message signal may be repeated throughout the host image, by for example, embedding the message signal in several blocks of the host image. In particular, the watermark encoder may embed instances of the watermark signal into contiguous blocks of pixels throughout a portion of the host image or throughout the entire host image.

Perceptual modeling may be applied to the host image to calculate a gain vector with gain values that correspond to the message signal elements. For example, in the case where the upsampled watermarked signal is added to the host signal, the gain values may be used to scale binary antipodal values of the message signal before adding them to the host signal. Each gain value may be a function of desired watermark visibility and detectability constraints. In particular, the perceptual model analyzes the image to determine the extent to which it can hide a corresponding element of the watermark image. One type of an analysis is to compute local contrast in a neighborhood around each pixel (e.g., signal activity) and select gain for pixel as a function of local contrast. A detectability model analyzes the host signal to determine the extent to which pixel values are biased toward the value of the watermark signal at the corresponding pixel locations. It then adjusts the gain up or down depending on the extent to which the host image pixels are biased towards the watermark signal.

This type of watermark may be read from the watermarked halftone image or other image representations of that watermarked image, such as a multilevel per pixel representation of the image at a resolution sufficiently high to represent the watermark signal. To decode the watermark, a watermark decoder detects the presence and orientation of the watermark in the watermarked image. It then performs an inverse of the embedding function to extract an estimate watermark message signal.

The message signal is robustly encoded using a combination of the following processes:

1. repetitively encoding instances of a message signal at several locations (e.g., blocks of the image);

2. spread spectrum modulation of the message, including modulation techniques using M sequences and gold codes; and 3. error correction coding, such as convolution coding, turbo coding, BCH coding, Reed Solomon coding, etc.

The watermark decoder reconstructs an embedded message from the estimated watermark signal by:

1. aggregating estimates of the same message element in repetitively encoded instances of the message;

2. performing spread spectrum demodulation, and 3. error correction decoding.

In one implementation, the decoder uses an orientation signal component of the watermark to detect its presence and orientation in the watermarked image. It then performs a predictive filtering on the image sample values to estimate the original un-watermarked signal, and subtracts the estimate of the original from the watermarked signal to produce an estimate of the watermark signal. It performs spread spectrum demodulation and error correction decoding to reconstruct an auxiliary message embedded in the watermarked signal.

For more details about embedding an image watermark, and detecting and reading the watermark from a digitized version of the image after printing and scanning see assignee's co-pending application Ser. No. 09/503,881 (now U.S. Pat. No. 6,614,914) and U.S. Pat. No. 5,862,260, which are hereby incorporated by reference. In order to make the watermark robust to geometric distortion, the watermark includes an orientation watermark signal component. Together, the watermark message signal and the orientation watermark signal form the watermark signal. Both of these components may be added to a host image at the resolution of the halftone image before the host image is converted to a the halftone image. Alternatively, these components may be combined to form the watermark signal used in modulating the error diffusion threshold used in an error diffusion type halftone process.

One type of watermark orientation signal is an image signal that comprises a set of impulse functions in the Fourier magnitude domain, each with pseudorandom phase. To detect rotation and scale of the watermarked image (e.g., after printing and scanning of the watermarked image), the watermark decoder converts the image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

The halftone watermarks described above may be used in combination with one or more other watermarks. In one application, for example, a robust watermark is used to carry a key that specifies the dot locations of a halftone watermark. In particular, the robust watermark's message payload carries a key that identifies specific dots (the high-resolution binary values) that were turned on or off in a specific pattern. These binary valued bits act as a secondary fragile watermark that can be verified by close inspection of the image.

FIG. 4 illustrates an implementation of this application. On the watermark embedding side, a watermark encoder 100 operates on an input image 102 to embed a robust watermark that survives printing, scanning, and geometric distortion. An example of this type of watermark is described above and in the patent and patent application incorporated by reference. At least part of the message payload of this robust watermark carries a key that is used to decode a halftone watermark at specified halftone dot locations in a halftone image.

In this implementation, the key includes a seed to a random number generator 104 that identifies locations of the halftone watermark dots in the halftone image and also specifies the binary values (on or off) of the dots at those locations. A halftone converter 106 (e.g., error diffusion, blue noise masking, etc.) then converts the robustly watermarked image into a halftone image while ensuring that the halftone watermark dots are assigned the correct values based on the output of the random number generator.

One example of this process is the modified error diffusion method described above in which the halftone converter diffuses the error introduced by halftone watermark dots to a spatial neighborhood around their respective locations while ensuring that those watermark dot values remain fixed. This approach reduces the perceptible impact of the halftone watermark. Other halftone methods may be used as well as long as they ensure that the halftone watermark dots are set as specified by the key. The result is a halftone image 108 that may be printed using conventional printer technology, such as ink jet printing, etc. (110). In fact, the watermark embedding process (100) may be implemented in a printer or software driver for a printer.

To verify the authenticity of the printed image, a scanner 120 captures a digital image from a printed image 122. Since the robust watermark survives printing and then scanning by a low resolution (e.g., 100 dpi) scanner or digital camera, it may be recovered from a digital image captured from the printed image 122. A watermark reader 124, using the decoding operations outlined above, detects the robust watermark, determines its orientation, and then reads the watermark payload, including the key. It supplies the key to a random number generator 126, which provides the halftone dot locations and values of the halftone watermark.

A secondary watermark verifier 128 then examines a suitably high resolution scan of the printed image to determine whether the halftone watermark is present. A "suitably high resolution scan" of the printed image is one in which the halftone dots of the printed image are readable. This high resolution scan may be the same image captured by the scanner 120 if it is at a sufficient resolution. Alternatively, a separate image capture device 130 may be used to capture a high resolution image depicting the halftone dots. The verifier 128 provides a signal indicating the extent to which the halftone watermark is present.

Based on the output of the verifier, a number of actions can be taken. Some actions include recording identifying information about the user (e.g., a device ID of the user's computer or imaging device, address (e.g., network address), user ID, etc.), sending this information and the result of the verification operation to a remote device via communication link, displaying information about rules governing use of the image, connecting the decoding system to a licensing or electronic transaction server (e.g., a web server) enabling the user to license or purchase related rights, products or services, etc. electronically.

Both the robust and fragile halftone watermark may also carry other information. They may be used to carry a message, including usage control instructions or other metadata like an identifier of the image owner, a computer address for establishing a remote connection (e.g., an IP address, URL, etc.) or an index to a database record storing related information. In one application, the message carries an identifier that is used to fetch related information to the image. In particular, the watermark decoder communicates the identifier to a database management system in the form of a request. The database management system and underlying database records may be implemented in a remote device connected to the watermark decoder device via a network connection (e.g., a web server on the Internet connected via a TCP/IP connection) or within the system containing the watermark decoder (e.g., a local database executing within the same device as the decoder or within a computer locally connected to the decoding device via a port, such as a serial, parallel, infrared, Bluetooth wireless or other peripheral port). In response to the request, the database looks up information related to the identifier or identifiers extracted from the robust watermark. The database either returns the information to the watermark decoding device (e.g., a personal computer, personal digital assistant, Internet appliance, scanner, printer, etc.), or forwards it to one or more other devices along with an address of the decoding device, which in turn, return related information to the decoding device. One example is to use an identifier or address encoded in the robust watermark to fetch information from a web site related to the watermarked image. For more information on this use of the robust watermark, see U.S. Pat. No. 5,841,978 and co-pending applications Ser. Nos. 09/571,422, 09/563,664 (now U.S. Pat. No. 6,505,160), and Ser. No. 09/597,209 (now U.S. Pat. No. 6,411,725), which are hereby incorporated by reference.

As noted previously, for many image watermark applications, it is necessary to, as part of the watermark detection and reading process, determine the orientation (scale, rotation, etc.) of the watermarked image prior to the process of reading the watermark. One way to determine orientation of a watermarked image relative to its orientation at the time of embedding the watermark is to use some form of calibration signal as part of the watermark. The calibration signal may be integrally related to the watermark message signal, such as a carrier signal or synchronization code. Alternatively, it may be a distinct signal, such as an imperceptible registration template.

The following watermarking method uses a halftone image screen as an orientation signal, avoiding the need to embed a separate calibration signal. The halftone screen may be one normally used to print un-watermarked halftone images, or one specifically adapted to create and print watermarked halftone images.

This method is suitable for image halftoning methods in which the halftoning is implemented through the use of threshold masks. A threshold mask is a pattern which can be tiled in a repetitive fashion over an image. Most commonly, the threshold mask is a square matrix of numbers. For example, the threshold mask may be 128×128, and the image may be comprised of an array of 8-bit pixels. In this case, the threshold mask contains numbers ranging from 0 to 255, corresponding to the 256 possible levels in an 8 bit pixel value. In cases where the number of elements in the mask exceeds the number of levels per pixel, the threshold mask is usually designed to include an equal number of occurrences of each level. For example, in the current example where there are 16384 elements in a 128×128 mask, there are 64 entries of the threshold mask for each level (16384/256=64). It is possible to use a 16×16 mask with each element corresponding to a different level from 0 to 255. However, when tiled across the image, such a mask may introduce more visual artifacts than the larger mask. Of course, these masks are just examples, and there are many alternative combinations of mask sizes, dimensions, and levels for threshold masks used in halftone screen processes.

In a typical halftone screen process, the threshold mask is used to create the binary pattern of ink dots used to represent the printed version of an image. If an image with 200 pixels per inch is to be printed using 2400 dots per inch of resolution, the image is first upsampled to 2400 pixels per inch. Then the threshold mask is tiled and applied to the upsampled image to construct the halftone image. Each pixel of the halftone image is calculated from the corresponding pixel of the upsampled image and the value of the tiled threshold mask at that location. If the threshold mask value is less than or equal to the upsampled image pixel, then the halftone image pixel is set to 1; otherwise it is set to 0.

Error diffusion halftoning may not be implemented in this way.

Figure 5:
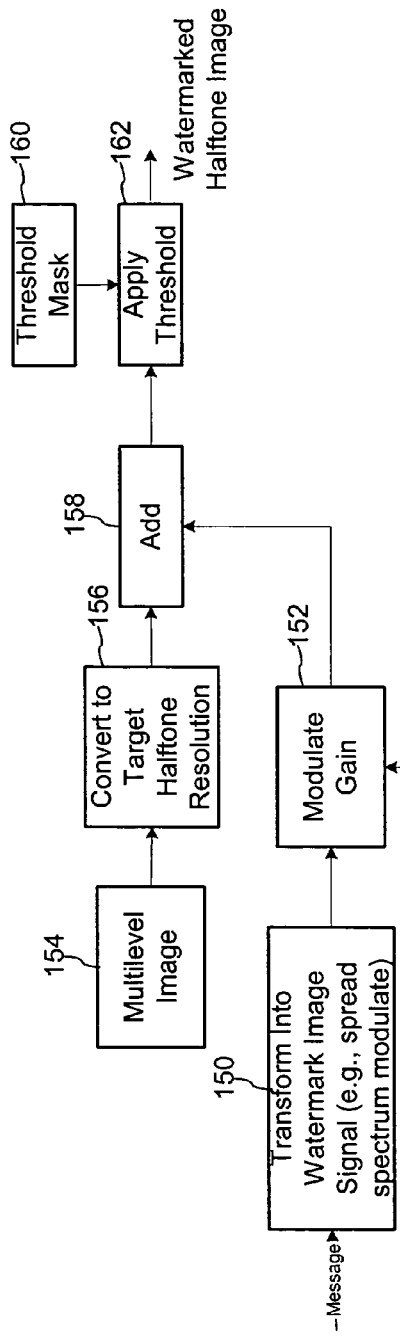
FIG. 5 is a diagram illustrating a method of creating a watermarked halftone image using a threshold mask.

FIG. 5 is a diagram illustrating a method of creating a watermarked halftone image using a threshold mask. The watermark encoding process begins by transforming an auxiliary message into a watermark image signal (150). The method shown in FIG. 5 can be used with a variety of methods of constructing a watermark image signal. For the purpose of illustration, FIG. 5 cites an example using a spatial spread spectrum watermark. In this case, a watermark message payload is spread spectrum modulated over an area coextensive with the threshold mask. Alternative watermark encoding functions may be used, such as frequency domain techniques, where the watermark signal modulates frequency coefficients to encode message symbols, or statistical feature modulation where the watermark modulates features of the signal, such as its autocorrelation, power, amplitude, signal peaks, etc. Each of these embedding functions can be characterized as adding a spatial watermark image signal with corresponding elements in the host image.

The encoder may modulate the watermark image signal with a gain to make the watermark message more likely to be recovered, less visible, or some balancing of recoverability and imperceptibility. In the case of the spatial spread spectrum watermark image, the encoder converts the message to a binary antipodal signal (150) and a gain modulator adjusts the value of each element of that signal (152). The spatial resolution of the watermark image signal corresponds to the target halftone image.

The watermark image signal may be tiled, so that the same payload is repeated over the image, or it may be varied, so that different information is embedded in different areas of the image.

To prepare the host image for the watermark, the encoder takes a multilevel per pixel form of the image (154) and converts it to the halftone resolution (156). This step typically involves upsampling the multilevel image to a higher resolution (e.g., upsampling a 200 dpi, 8 bit per pixel image to a 2400 dpi per pixel image). One method for inserting the watermark is to add a spatial domain representation of the watermark image signal with the multilevel image signal (158), each at the halftone image resolution, to create a composite image.

Next, the encoder applies a threshold mask (160, 162) to the resulting composite image. The halftone screen process converts pixel levels below or equal to the corresponding threshold mask level to zero, otherwise it sets them to one. The result is a watermarked halftone image. The image may then be printed using a variety of halftone printing process, including ink jet printers and printing presses.

Figure 6:
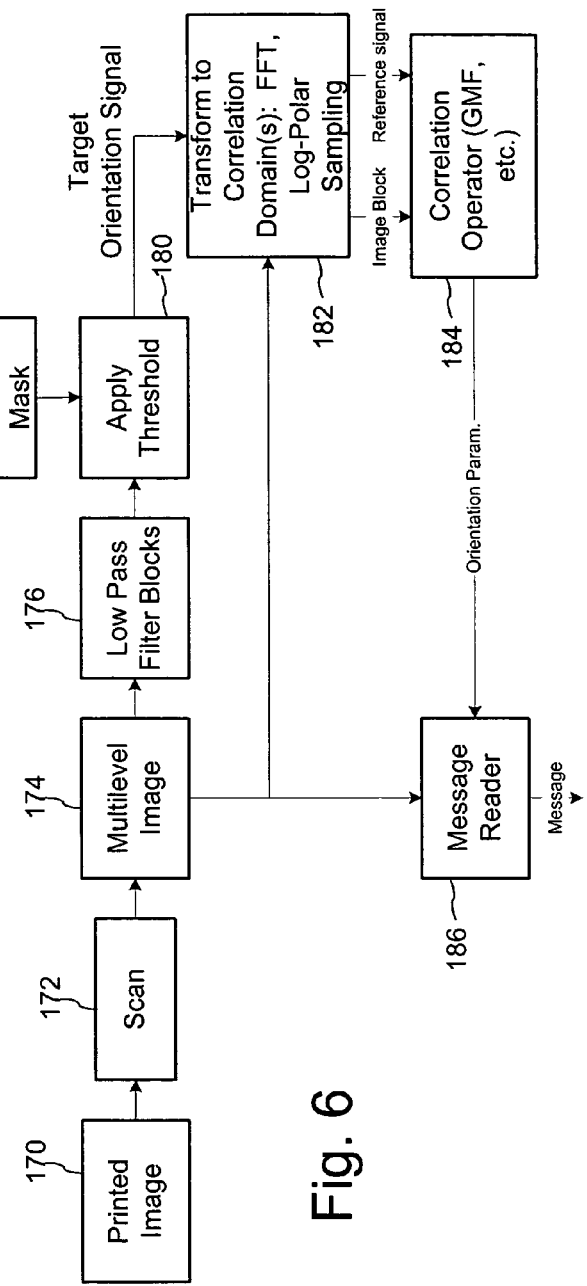
FIG. 6 is a diagram illustrating a method using the halftone screen as an orientation signal to determine geometric distortion of a watermarked image signal.

FIG. 6 is a diagram illustrating a method using the halftone screen as an orientation signal to determine geometric distortion of a watermarked image signal. In particular, this method is used to calculate the orientation of the host signal at the time of watermark embedding to facilitate recovery of a watermark message.

First, a scanner or camera or other imaging device captures a digital version of the printed, watermarked image 170 at sufficiently high resolution (172) to distinguish the halftone pixels. In the continuing example, a watermark decoder obtains blocks of a digital image 174, each having an area approximately corresponding to the size of the threshold mask (e.g., 128×128). Each digital image pixel is approximately equal in size to a halftone image pixel.

Next, the decoder filters the image block using a low pass filtering technique 176 like computing the average pixel value and replacing each pixel with the average. Next, the decoder applies the same threshold mask used to create the halftone image for printing (178, 180). This process results in a target orientation signal having orientation attributes similar to the original image.

To determine the geometric distortion of the received image relative to the original, watermarked image, the decoder performs a series of correlation operations between the target orientation signal and the received image. In the method shown in FIG. 6, the decoder converts both the received image block and the target orientation signal derived from it to a correlation domain (182). In particular, it performs a 128×128 Fast Fourier Transform and resamples the resulting Fourier magnitude representation into a log-polar coordinate system to get a Fourier-Mellin representation of both images. Correlation operators 184, such as a generalized matched filter, correlate the Fourier-Mellin representation of the target signal (the reference signal) with a Fourier-Mellin representation of the received image. The correlation operation produces an estimate of the scale and rotation parameters of the digital image.

The decoder transforms the received spatial digital image by the inverse of the estimated rotation and scale. The correlation operator correlates the resulting spatial image with the spatial target orientation signal to obtain an estimate of the translation of the image with respect to the threshold mask.

Having estimates for the scale, rotation, and translation parameters of the digital version of the watermarked image, a watermark message reader (186) demodulates the spread spectrum watermark signal from the received image.

Each of the halftone watermark methods described above may be used in "fragile watermark" or "semi-fragile" watermark applications, where the watermark is analyzed to detect and characterize alterations to a watermarked image. A fragile watermark refers to a watermark that degrades or becomes unreadable when the host image is subjected to certain types of distortion. A semi-fragile watermark is a variant on this theme where the watermark survives some types of distortion, but not others.

One approach is to design the watermark so that it degrades or becomes unreadable in response to certain types of distortions, like printing, scanning on consumer grade scanners, image compression, etc. If the decoder is unable to detect or read the watermark, or the measured degradation exceeds a threshold, then the decoder provides output indicating that the image has been altered (e.g., is not authentic). The degradation can be measured by the extent of recovery of the watermark signal, such as the extent of correlation between a known watermark signal and one extracted from a received image. In such fragile or semi-fragile applications the gain values of the halftone watermark methods previously described may be chosen to provide an explicit balance between ease of reading and fragility with respect to certain types of distortions.

An enhanced approach is to design the watermark such that the type of alteration can be distinguished. For example, the type of alteration can be characterized by the type of degradation it causes to the watermark signal. By quantifying the degradation to different aspects of the watermark signal, a decoder can match the observed degradation to a particular type of alteration.

The performance of such fragile watermarking applications can be improved by choosing the frequency distribution of the embedded watermark to differentiate between different forms of distortion. There are two main considerations in designing the watermark signal attributes. The first is to put part of the watermark's energy in frequencies that are likely to be degraded by a particular type of degradation to be detected (such as print and scan operations); the second is to put energy in the frequencies that are less likely to be degraded by distortion that the watermark should survive (such as smudges, and normal wear and tear). By analyzing the frequency distribution of the watermark, the decoder can distinguish between forms of alteration. This approach is particularly useful to determine whether a printed image is genuine (e.g., whether it has been reproduced through a scan and print operation), as opposed to being merely soiled and worn through ordinary use.

A digital watermark may be embedded into a halftone image by using the digital watermark signal as a halftone screen. The following discussion illustrates an example of the process:

1. Create a digital watermark signal, for example, using spread spectrum techniques described above. Optionally, the watermark signal may include an orientation signal, such as a pseudorandom carrier signal that yields a pattern of signal peaks when transformed into the autocorrelation domain or an orientation signal that yields a pattern when transformed into a frequency domain, such as the Fourier domain.

The resulting watermark signal is a multi-level per pixel gray scale image or array of luminance values. It has a known block size, such as 64 by 64, 128 by 128, 256 by 256 pixel elements that can be tiled contiguously to create an image of varying sizes.

2. Calculate a histogram of the watermark image block.
3. Use the histogram to set halftone threshold levels for corresponding gray values (or luminance values). This example uses gray levels, but the same technique applies to luminance values as well as other color channels of color images. These halftone threshold levels are later used to convert a multilevel pixel value to a binary state of "on" or "off" of a halftone pixel by comparing the multilevel pixel value to the threshold and setting the halftone pixel at that location to a zero or one depending on whether the multilevel pixel value is less or greater than the threshold.

For each discrete gray value between 0–255, for example, the method picks a threshold level that, when applied to the multilevel pixel values in the watermark image block, the resulting halftone image has a tone density that achieves the desired gray value.

If the same watermark signal is to be embedded in several halftone images, the thresholds set by this process may be used over and over to create watermarked halftone images with the same embedded signal. Here's how the process of creating the halftone image operates:

1. Upsample or otherwise convert the target host multilevel per pixel image to the halftone dot resolution. Also, upsample or otherwise convert the multilevel per pixel watermark block to the halftone dot resolution, and if necessary, tile the blocks in a contiguous pattern across the target image so that the watermark signal is coextensive with the target image.
2. For each multilevel pixel value in the upsampled image, look-up the corresponding halftone threshold level that corresponds to that level.
3. Apply the threshold to the corresponding multilevel per pixel value in the watermark signal to get a halftone dot value that is either a zero or one. When the halftone conversion process of stages 2 and 3 is complete, the result is a watermarked halftone image that may be printed on paper or other objects.

Each halftone dot in the watermarked halftone image is either ink (minimum luminance,) or no ink (maximum luminance). As such, a high luminance value in the target host image sets a threshold such that a corresponding pixel in the watermark image is more likely to be set to the "no ink" state. Conversely, a low luminance value in the target image sets a threshold such that a corresponding pixel in the watermark image is more likely to be set to an "ink present" state.

This process of converting an image to a watermarked halftone image may be applied to one or more color planes in a color halftone image.

If the target host image is a simple gray level image with only a few different gray levels, then the above technique can be used to set thresholds for each of the gray levels in the host image. Also, while the host image may have several gray levels, these gray levels can be divided into ranges, where each range is assigned a single halftone threshold. Masks can then be calculated to define the areas of the host image that correspond to each of the halftone thresholds. Finally, the halftone threshold corresponding to the particular mask is applied to the watermark signal areas covered by the mask to create a watermarked halftone image.

Consider the following example where the host image has three gray levels, each with a corresponding mask defining the areas of the image where those gray levels reside. This method now thresholds the multilevel per pixel watermark signal, coextensive with the target image, based on three different masks that correspond to areas of a particular tonal density in the target image:

mask 1 has tonal density D1, and uses threshold T1
mask 2 has tonal density D2, and uses threshold T2
mask 3 has tonal density D3, and uses threshold T3.

There are a variety of ways to create the digital watermark signal in this technique. One way is:
1. Take a desired watermark message payload comprising an N bit binary string.
2. Perform error correction encoding of the message, such as convolution coding, turbo coding, etc.
3. Spread each bit of the error correction encoded message over a pseudorandom carrier signal by, for example, taking the XOR of the bit value with each value in the pseudorandom carrier;
4. Map the spread signal values to pixel locations in a watermark image block.
5. Convert spread signal to multilevel per pixel watermark signal. At this stage, the spread signal values are binary, e.g., {1,0}, or {1,−1} representing increases or decreases in corresponding sample values (e.g., luminance, gray level, intensity, etc.) Each binary value corresponds to one or more neighboring pixels in the watermark signal. These binary values may be converted to multilevel values by adjusting a midlevel pixel value (e.g., mid level gray value of 128 in an 8 bit pixel) up or down corresponding to the value of the spread signal. The gain of the watermark signal may be adjusted by applying a scale factor to the spread signal. Further, the changes from each bit of the spread signal may be made to smoothly vary over the corresponding pixels in the neighborhood.

There are a variety of techniques to create the spread signal, such as convolving the message with the carrier, multiplying a binary antipodal message signal with a binary antipodal carrier, etc. The carrier may be used for synchronizing the detector with the watermark in a watermarked signal. Also, as detailed above, an orientation signal may be added to the spread signal to assist in calibration.

To recover the watermark message, a watermark detector operates as follows:
1. Capture a digital version of the halftone image (e.g., from a web cam or scanner capture of the printed halftone image).
2. Detect and align the image using any one of the techniques described previously.
3. Predict the watermark signal at each pixel in the aligned image from neighboring pixels; e.g., using a filter to de-correlate the host signal from the watermark signal.
4. Correlate the watermark signal with the carrier to recover the error correction encoded bit values. These may be "soft" bit values weighted by the extent of correlation with the carrier. In other words, rather than representing each estimate of an error correction encoded bit as hard one or zero, they are represented by some weighted probability between values corresponding to a binary one or zero (e.g., between −1 and 1, −128 and 128, etc.)
5. Perform error correction decoding on the soft bit values, e.g., using a convolution or turbo coding scheme compatible with the embedded message to recover the message payload.

The process of reading the watermark may also be used to detect whether the watermarked halftone image has been altered. In particular, it may be used to determine whether the printed halftone image has been copied, e.g., photocopied, or scanned and re-printed.

The detected strength of the watermark signal may be compared to a copy detection threshold to determine whether the printed object has been copied. One approach for measuring the strength of the watermark signal is as follows:
1. Use the message payload read from the watermark to re-create the original embedded bit sequence (including redundantly encoded bits from error correction coding) used for the watermark.
2. Convert the original bit sequence so that a zero is represented by −1 and a one is represented by 1.
3. Multiply (element-wise) the soft-valued bit sequence used to decode the watermark by the sequence of step 2.
4. Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, etc.
5. Compare the strength measures to thresholds to decide if the suspect image has been captured from an original or a copy of the printed object. The threshold is derived by evaluating the difference in measured watermark strength of copied vs. original printed objects on the subject printer platform used to create the original, and a variety of copiers, scanners and printers used to create copies.

As an additional method of detecting copying, the watermark message payload may be used to identify the printer model and/or resolution of the watermarked halftone image. Then, to verify a printed object is authentic, the watermark detector extracts the message payload and determines the printer model and/or printed resolution. A forensic scan of the printed object is than analyzed to verify that the object was printed at the resolution specified in the watermark payload. One specific way to analyze the resolution of the forensic scan is examine its frequency content to determine if it was likely printed at the specified resolution.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of measuring digital watermark strength comprising:
   processing a watermarked signal to extract estimates of error correction encoded bits embedded into the watermarked signal;
   decoding the error correction encoded bits to compute a message payload;
   re-encoding the message payload to compute error correction encoded bits;
   computing a measure of watermark strength from the error correction encoded bits and the estimates of error correction encoded bits.

2. The method of claim 1 wherein the measure of watermark strength is compared with a strength threshold to detect degradation of the watermark signal.

3. The method of claim 2 wherein the watermarked signal is an image captured of a printed object, and the strength threshold is used to detect whether the printed object is an original or a copy.

4. The method of claim 1 wherein the message payload includes printer information about a printer used to print the watermarked signal; and the printer information is used to determine whether a printed object bearing the watermarked signal is an original or a copy.

5. A computer readable medium on which is stored instructions for executing the method of claim 1.

6. A method of measuring digital watermark strength comprising:
   detecting a watermark signal in a watermarked signal;
   decoding a message encoded in the detected watermark signal;
   re-creating an original watermark signal from the message; and
   comparing the original watermark signal and the detected watermark signal as a measure of strength of the detected watermark signal.

7. The method of claim 6 wherein the comparing includes multiplying the original and the detected watermark signal.

8. The method of claim 6 wherein the decoding includes performing error correction decoding of the message from the detected watermark signal; and wherein the re-creating includes error correction coding the decoded message to form the original watermark signal.

9. The method of claim 6 wherein the measure of watermark strength is compared with a strength threshold to detect degradation of the watermark signal.

10. The method of claim 9 wherein the watermarked signal is an image captured of a printed object, and the strength threshold is used to detect whether the printed object is an original or a copy.

11. The method of claim 6 wherein the message includes printer information about a printer used to print the watermarked signal; and the printer infonnation is used to determine whether a printed object bearing the watermarked signal is an original or a copy.

* * * * *